A. MOORE.
SPRING WHEEL.
APPLICATION FILED SEPT. 13, 1907.

942,276.

Patented Dec. 7, 1909.

WITNESSES:
Walter A. Greenburg
Anna M. Dow

INVENTOR:
ALFRED MOORE.

BY
ATTORNEYS.

UNITED STATES PATENT OFFICE.

ALFRED MOORE, OF DETROIT, MICHIGAN.

SPRING-WHEEL.

942,276.  Specification of Letters Patent.  Patented Dec. 7, 1909.

Application filed September 13, 1907. Serial No. 392,651.

*To all whom it may concern:*

Be it known that I, ALFRED MOORE, a citizen of the United States of America, residing at Detroit, in the county of Wayne and State of Michigan, have invented certain new and useful Improvements in Spring-Wheels, of which the following is a specification, reference being had therein to the accompanying drawings.

This invention relates to spring wheels for vehicles and consists in the matters hereinafter set forth, and more particularly pointed out in the appended claims.

Figure 2:
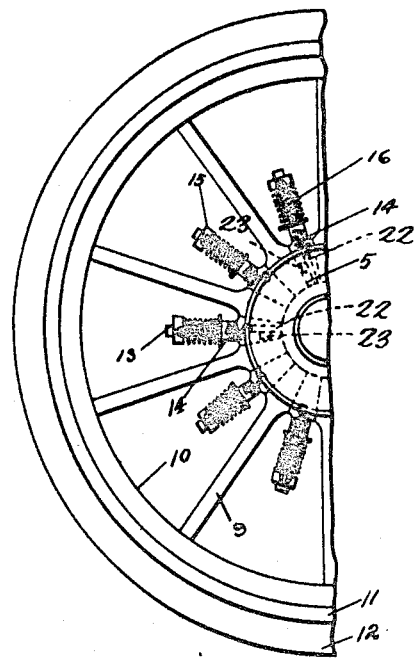
Figure 1:
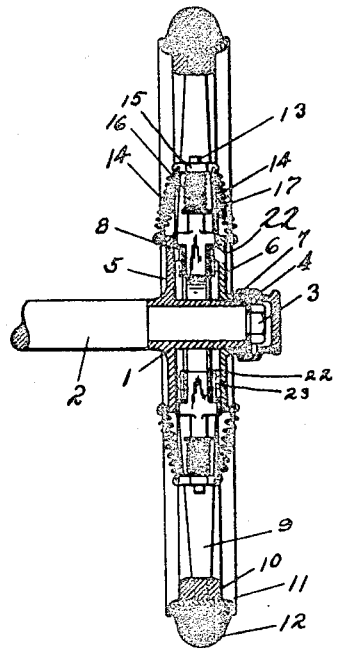
Figure 3:
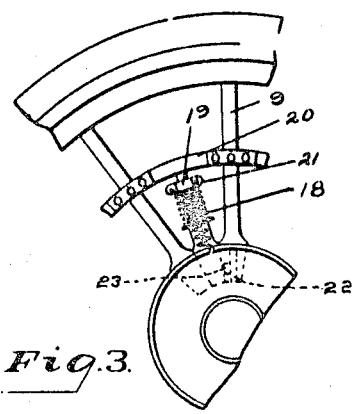
Figure 4:
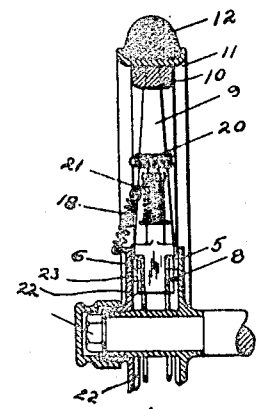

Referring to the drawings, Figure 1 is a view in cross-section of a wheel embodying features of the invention. Fig. 2 is a view in elevation of a portion of the wheel with parts broken away. Fig. 3 is a fragmentary detail view in elevation of a modified form of the wheel. Fig. 4 is a view in section of the modified form.

In general terms, the wheel consists of an inner main hub adapted to be journaled on an axle and an outer floating hub held normally in concentric relation with the inner hub between suitable guides by a set of load sustaining springs held constantly in tension by a set of opposing springs which prevent any compression or buckling of the load springs as the latter change their position when the wheel revolves.

In the drawings, 1 represents a main hub adapted to be rotatably secured on an axle 2 in the usual manner, as by a bur 3 and washer 4. A circular flange 5 is fixed to or preferably formed integrally on the inner end of the hub and a correspondingly sized removable flange 6 having a sleeve 7 is screw-threaded on to the outer end or otherwise adjustably secured thereon.

A floating or movable hub having an enlarged central aperture encircles the fixed hub between the flanges which act as guides. This hub may be built up like the navel of any wheel of conventional design provided with metallic end or face plates 8 which afford bearing surfaces against the flanges. Spokes 9, felly 10, rim 11, and tire 12, all of standard construction, completing the wheel body.

In the preferred form of the wheel radial guide arms 13 are inserted between the spokes, and may be of wood metal sheathed, or entirely of metal. The floating hub is suspended or centered normally on the fixed hub by pairs of radially disposed main springs 14 secured at the inner ends in any preferred manner to or near the rims of the flanges 5 and 6 and at their outer ends connected to collars 15 sliding on the guides and bearing against auxiliary springs 16 whose inward movements are checked by suitable stops 17. The auxiliary springs are so proportioned and adjusted as to close together and act as ferrules when the weight or load tends to stretch the main springs, while they expand and prevent buckling of the main springs when the latter are compressed by the load during a portion of the revolution of the wheel. Each pair of main springs may be replaced when desired by a single spring 18 attached to opposite points of a collar 19 by a suitable hanger or stirrup 21, in which case the end of the arm is preferably connected to the adjacent spokes by a cross-brace 20 properly secured thereto, so that the side pull of the spring is carried directly to the wheel body.

Stops of any preferred form are supplied which permit rotation of the outer hub on the inner through a limited arc. These may be in the shape of sets of opposing lugs 23 and 22 on the flanges 5 and 6 and the face plates 8.

Other details may be changed without departing from the spirit of the invention, and I do not care to limit myself to any particular form or arrangement of parts.

What I claim as my invention is:—

1. A spring wheel having a main hub, a floating hub encircling the main hub, means adapted to maintain the hubs in proper lateral relation and to confine their relative rotation to a limited arc, main springs radially disposed on the main hub, and radially disposed auxiliary springs on the floating hub connected at their outer ends to the outer ends of the main springs.

2. A spring wheel having a main hub, a floating hub encircling the main hub, means adapted to maintain the hubs in proper lateral relation and to confine their relative rotation to a limited arc, main springs radially secured at their inner ends to the main hub, and radially disposed auxiliary springs on the floating hub connected at their outer ends to the outer ends of the main springs and adapted to close and act as ferrules when the main springs are under load tension.

3. A spring wheel having a main hub, a floating hub encircling the main hub, means adapted to maintain the hubs in proper lateral relation and to confine their relative rotation to a limited arc, radial guides on the floating hub, auxiliary springs on the guides, and radially disposed main springs connected at their inner ends to the main hub and at their outer ends to the outer ends of the auxiliary springs.

4. A spring wheel having a main hub, a floating hub encircling the main hub, means adapted to maintain the hubs in proper lateral relation and to confine their relative rotation to a limited arc, radial guides on the floating hub, auxiliary springs on the guides, and radially disposed main springs connected at their inner ends to the main hub and at their outer ends to the outer ends of the auxiliary springs, said auxiliary springs being adapted to close and act as ferrules when the main springs are under load tension.

5. A spring wheel having a main hub, a floating hub encircling the main hub, rigid spokes on the floating hub, a felly on the spokes, means adapted to maintain the hubs in proper lateral relation and to confine their relative rotation to a limited arc, radial guides on the floating hub, interposed between the spokes, auxiliary springs on the guides and radially disposed main springs connected at their inner ends to the main hub and at their outer ends to the outer ends of the auxiliary springs.

6. A spring wheel having a main hub, a floating hub encircling the main hub, rigid spokes on the floating hub, a felly on the spokes, means adapted to maintain the hubs in proper lateral relation and to confine their relative rotation to a limited arc, radial guides on the floating hub, interposed between the spokes, collars on the guides, stops on the guides, auxiliary springs on the guides between the collars and stops and radially disposed main springs connected at their inner ends to the main hub and at their outer ends to the collars.

7. A spring wheel having a main hub, a floating hub encircling the main hub, rigid spokes on the floating hub, a felly on the spokes, flanges adjustably secured on the main hub adapted to maintain the floating hub in proper lateral relation thereto, stops on the flanges and on the floating hub adapted to confine the relative rotation of the two hubs to a limited arc, radial guides on the floating hub, interposed between the spokes, auxiliary springs on the guides and radially disposed main springs connected at their inner ends to the main hub and at their outer ends to the outer ends of the auxiliary springs.

In testimony whereof I affix my signature in presence of two witnesses.

ALFRED MOORE.

Witnesses:
C. R. STICKNEY,
OTTO F. BARTHEL.